(12) United States Patent
Sugita

(10) Patent No.: US 11,302,482 B2
(45) Date of Patent: Apr. 12, 2022

(54) MULTILAYER CERAMIC CAPACITOR

(71) Applicant: Murata Manufacturing Co., Ltd., Nagaokakyo (JP)

(72) Inventor: Hiroaki Sugita, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 46 days.

(21) Appl. No.: 16/841,829

(22) Filed: Apr. 7, 2020

(65) Prior Publication Data

US 2020/0343047 A1 Oct. 29, 2020

(30) Foreign Application Priority Data

Apr. 26, 2019 (JP) .............................. JP2019-086526

(51) Int. Cl.
| | |
|---|---|
| *H01G 4/30* | (2006.01) |
| *H01G 4/12* | (2006.01) |
| *H01G 4/012* | (2006.01) |
| *H01G 4/248* | (2006.01) |

(52) U.S. Cl.
CPC ............. *H01G 4/30* (2013.01); *H01G 4/012* (2013.01); *H01G 4/12* (2013.01); *H01G 4/248* (2013.01)

(58) Field of Classification Search
CPC ............ H01G 4/30; H01G 4/12; H01G 4/248; H01G 4/012; H01G 4/1227; H01G 4/2325; H01G 4/1209; H01G 4/228; H01G 4/306
See application file for complete search history.

(56) References Cited

U.S. PATENT DOCUMENTS

| | | | |
|---|---|---|---|
| 9,236,185 B1* | 1/2016 | Oguni ...................... H01G 4/30 | |
| 2013/0094118 A1 | 4/2013 | Kim et al. | |
| 2014/0240898 A1* | 8/2014 | Kim ......................... H01G 4/30 | |
| | | | 361/303 |
| 2014/0254063 A1* | 9/2014 | Konishi ............... H01G 4/1245 | |
| | | | 361/301.4 |
| 2015/0116898 A1 | 4/2015 | Takashima et al. | |
| 2015/0155100 A1* | 6/2015 | Morita ................. H01G 4/1227 | |
| | | | 361/301.4 |
| 2016/0099107 A1* | 4/2016 | Lee ........................ H01G 2/065 | |
| | | | 174/260 |

(Continued)

FOREIGN PATENT DOCUMENTS

| | | |
|---|---|---|
| JP | 2002-164248 A | 6/2002 |
| JP | 2013-012418 A | 1/2013 |
| JP | 2013-089944 A | 5/2013 |

(Continued)

*Primary Examiner* — Michael P McFadden
(74) *Attorney, Agent, or Firm* — Keating & Bennett, LLP

(57) ABSTRACT

A multilayer ceramic capacitor includes a laminate including a plurality of dielectric layers laminated one on the other, the laminate being in a cuboid or substantially cuboid shape. The multilayer ceramic capacitor includes external electrodes on the end surfaces of the laminate. A first inner electrode layer exposed through the first end surface and a second inner electrode layer exposed through the second end surface are provided on the dielectric layer. A first region and a second region are defined in the first inner electrode layer and the second inner electrode layer, in which coverages of the first inner electrode layer and the second inner electrode layer to the dielectric layer are greater in the first region than in the second region.

13 Claims, 8 Drawing Sheets

(56) References Cited

U.S. PATENT DOCUMENTS

2016/0111216 A1* 4/2016 Lee .................... H01G 4/012
        361/301.4
2016/0329151 A1* 11/2016 Ishida ................ H01G 4/1227

FOREIGN PATENT DOCUMENTS

| JP | 2014-187217 A | 10/2014 |
| JP | 2015-111651 A | 6/2015 |

* cited by examiner

FIG.6A
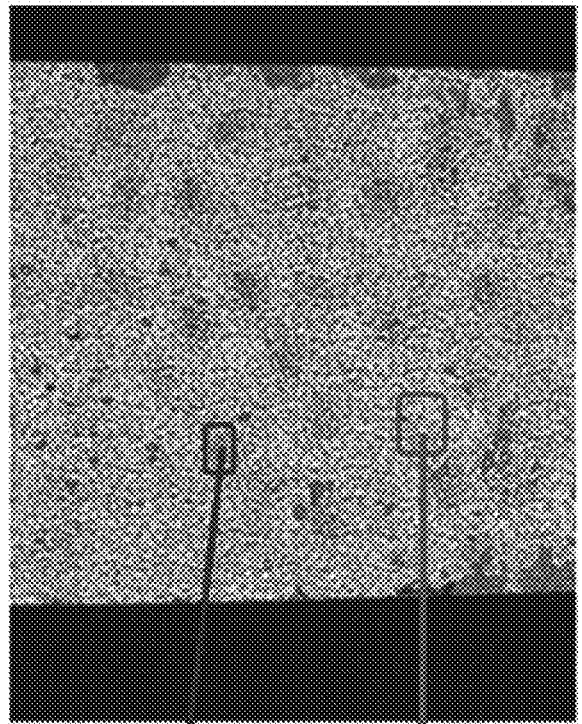
FIG.6C 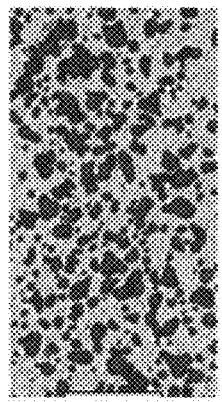 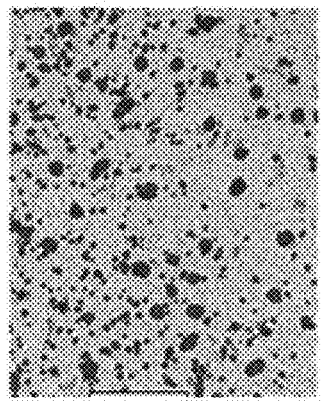 FIG.6B

MULTILAYER CERAMIC CAPACITOR

CROSS REFERENCE TO RELATED APPLICATIONS

This application claims the benefit of priority to Japanese Patent Application No. 2019-086526 filed on Apr. 26, 2019. The entire contents of this application are hereby incorporated herein by reference.

BACKGROUND OF THE INVENTION

1. Field of the Invention

The present invention relates to a multilayer ceramic capacitor, and, more particularly, to a multilayer ceramic capacitor which includes a dielectric layer made of a ceramic dielectric material, the dielectric layer being included in an electronic circuit, for example.

2. Description of the Related Art

Generally, a capacitor element includes a laminate in which inner electrodes layer and dielectric layers are alternately laminated, and external electrodes on outer surfaces of the laminate.

The multilayer ceramic capacitor is a type of a capacitor element whose dielectric layer is made of a ceramic dielectric material.

Typically, the multilayer ceramic capacitor has an inner layer portion having a generally cuboid shape in which multiple inner electrode layers and multiple dielectric layers are alternately, densely laminated. Outer layer portions, each formed of a dielectric layer is disposed, sandwiching the inner layer portion therebetween, thereby forming a laminate in which the inner electrode layers and the dielectric layers are alternately laminated.

In order to increase the capacitance of the multi-layer ceramic capacitor, the opposing area of adjacent inner electrode layers included in the inner layer portion needs to be increased. To that end, increasing the density of the inner electrode material of the laminate in which the inner electrode layers are located, that is, the density of the inner electrodes, stated differently, increasing the coverage of the inner electrode layers to the dielectric layers is effective. This enhances the continuity of the inner electrode layers, thereby increasing the above-mentioned opposing area. This leads to a large capacitance multi-layer ceramic capacitor.

For example, Japanese Patent Laid-Open No. 2013-12418 discloses a multilayer ceramic capacitor which includes inner electrode layers having enhanced continuity.

However, if the continuity of the inner electrode layers is enhanced in the manner as the multilayer ceramic capacitor disclosed in Japanese Patent Laying-Open No. 2013-12418, the multilayer ceramic capacitor is prone to delamination.

Here, the delamination refers to a delamination phenomena that is caused due to a large difference in terms of the ease of compression and expansion between the inner electrode layer and the dielectric layer. A thermal history, applied to the multilayer ceramic capacitor, acts as a shear force at the interfaces between the dielectric layers and the inner electrode layers, thereby causing the delamination to occur.

In contrast, in order to suppress the delamination, the continuity of the inner electrode layers may be reduced, in which case a reduction in the acquired capacitance of the multi-layer ceramic capacitor results.

SUMMARY OF THE INVENTION

Preferred embodiments of the present invention provide multilayer ceramic capacitors that are each able to reduce or prevent a structural defect, for example, delamination, from occurring and also reduce or prevent a significant reduction of acquired capacitance.

A multilayer ceramic capacitor according to a preferred embodiment of the present invention includes a laminate which includes a plurality of dielectric layers that are laminated, the laminate including a first primary surface and a second primary surface facing each other in a lamination direction in which the plurality of dielectric layers are laminated, a first side surface and a second side surface facing each other in a width direction of the laminate perpendicular or substantially perpendicular to the lamination direction, and a first end surface and a second end surface facing each other in a longitudinal direction of the laminate perpendicular or substantially perpendicular to the lamination direction and the width direction; a first inner electrode layer provided on the dielectric layer, the first inner electrode layer being exposed at the first end surface; a second inner electrode layer provided on the dielectric layer, the second inner electrode layer being exposed at the second end surface; a first external electrode provided on the first end surface, the first external electrode being electrically connected to the first inner electrode layer, and a second external electrode provided on the second end surface, the second external electrode being electrically connected to the second inner electrode layer, wherein the first inner electrode layer and the second inner electrode layer, provided on the dielectric layer, each include a first region and a second region which are irregular, a coverage of the first inner electrode layer to the dielectric layer and a coverage of the second inner electrode layer to the dielectric layer are greater in the first region than in the second region.

In a multilayer ceramic capacitor according to a preferred embodiment of the present invention, the first inner electrode layer and the second inner electrode layer provided on the dielectric layer include the first region in which the coverages of the first inner electrode layer and the second inner electrode layer to the dielectric layer are relatively large; and the second region in which the coverages of the first inner electrode layer and the second inner electrode layer to the dielectric layer are relatively small are irregular. Thus, the difference in compression and expansion between the dielectric layer and the inner electrode layer is able to be dispersed. Moreover, since the first region and the second region are provided in combination, multiple second regions promote the adhesion between the upper and lower dielectric layers, thus reducing or preventing a structural defect, for example, delamination, from occurring and reducing or preventing a significant reduction of acquired capacitance.

The multilayer ceramic capacitors according to preferred embodiments of the present invention provide advantageous effects of reducing or preventing a structural defect, for example, delamination, from occurring and reducing or preventing a significant reduction of acquired capacitance.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6A is a photograph of the inner electrode layer included in the multilayer ceramic capacitor according to the preferred embodiment of the present invention, FIG. 6B is an enlarged photograph of a first region indicated by B in FIG. 6A, and FIG. 6C is an enlarged photograph of a second region indicated by C in FIG. 6A.

DETAILED DESCRIPTION OF THE PREFERRED EMBODIMENTS

1. Multilayer Ceramic Capacitor

Figure 1:
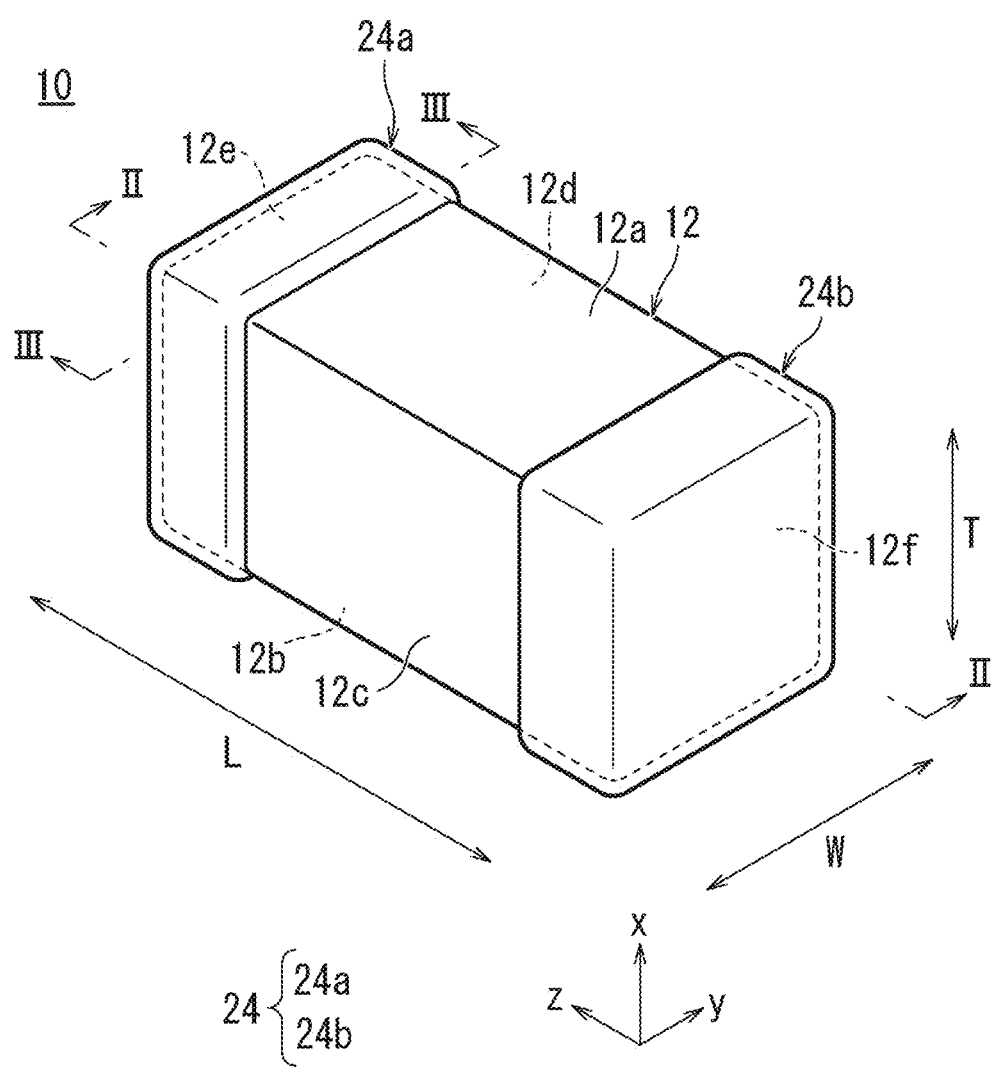
FIG. 1 is an external perspective view of a multi-layer ceramic capacitor according to a preferred embodiment of the present invention.
Figure 2:
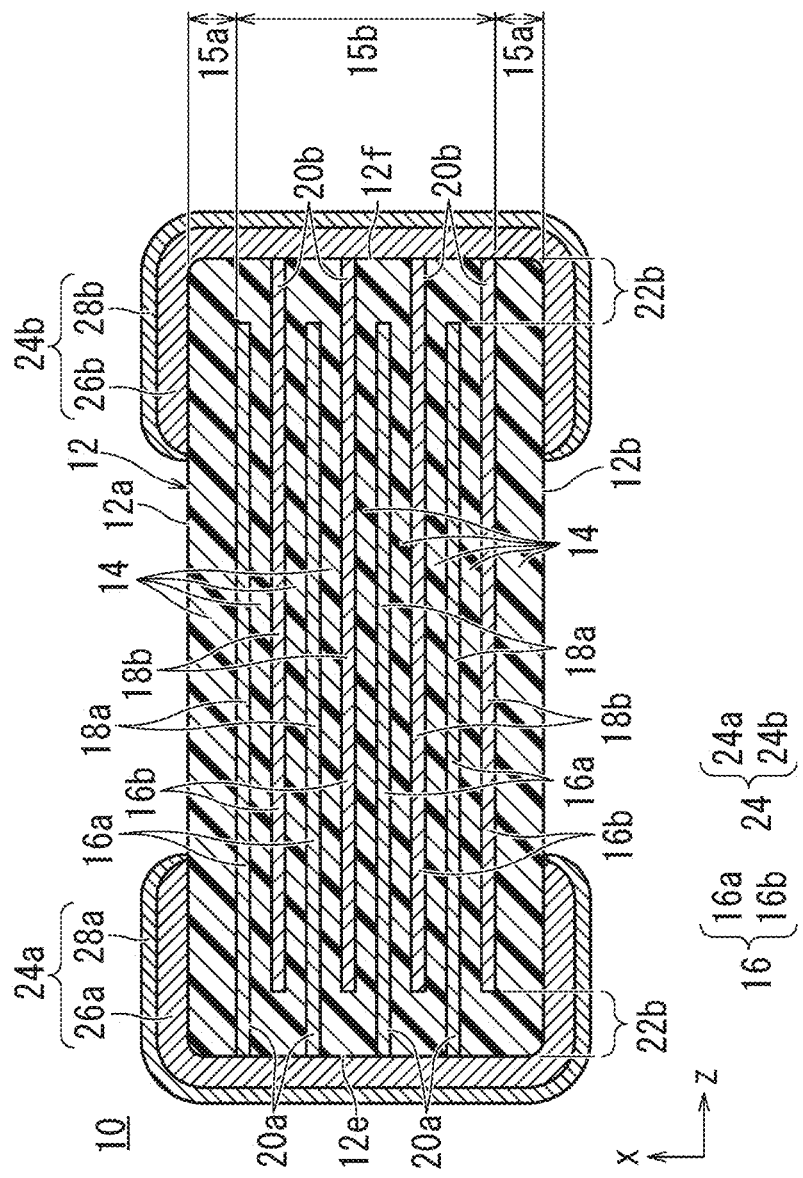
FIG. 2 is a cross-sectional view of the multi-layer ceramic capacitor according to the preferred embodiment of the present invention, taken along II-II line of FIG. 1.
Figure 3:
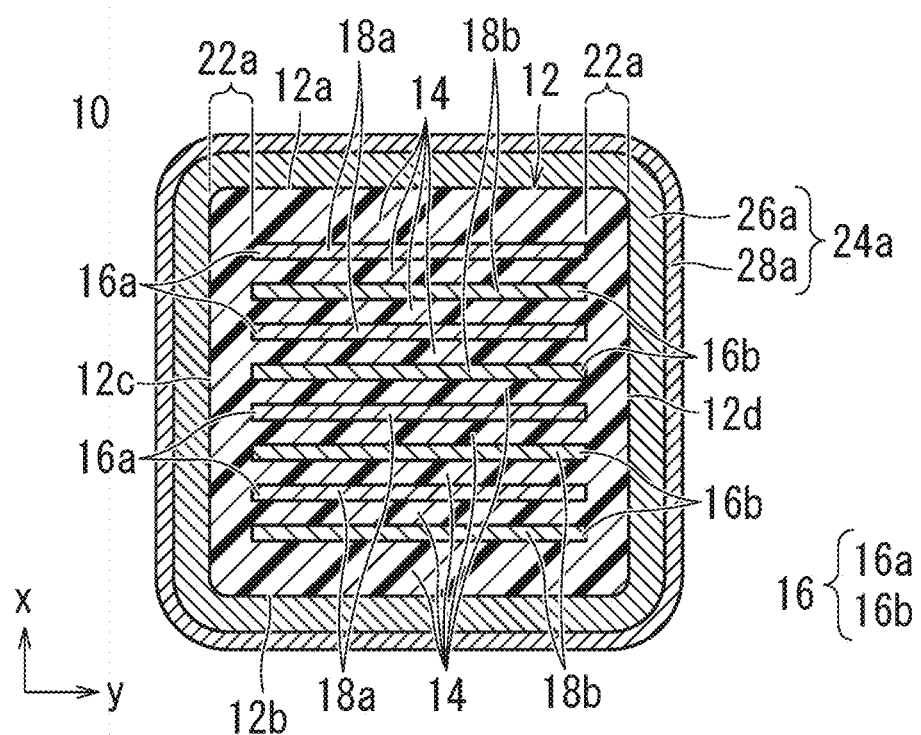
FIG. 3 is a cross-sectional view of the multi-layer ceramic capacitor according to the preferred embodiment of the present invention, taken along line of FIG. 1.

A multilayer ceramic capacitor according to a preferred embodiment of the present invention will be described with reference to the drawings. FIG. 1 is an external perspective view of one example of a multilayer ceramic capacitor according to a preferred embodiment of the present invention. FIG. 2 is a cross-sectional view of the multilayer ceramic capacitor according to the preferred embodiment of the present invention, taken along II-II line of FIG. 1. FIG. 3 is a cross-sectional view of the multilayer ceramic capacitor according to the preferred embodiment of the present invention, taken along line of FIG. 1.

As shown in FIGS. 1 through 3, a multilayer ceramic capacitor 10 includes a laminate 12 having a cuboid or substantially cuboid shape.

Laminate 12 includes multiple dielectric layers 14 and multiple inner electrode layers 16 laminated one on the other. Laminate 12 further includes a first primary surface 12a and a second primary surface 12b which are opposing surfaces in a lamination direction x in which dielectric layers 14 and inner electrode layers 16 are laminated; a first side surface 12c and a second side surface 12d which are opposing surfaces in a width direction y perpendicular or substantially perpendicular to lamination direction x; and a first end surface 12e and a second end surface 12f which are opposing surfaces in a longitudinal direction z perpendicular or substantially perpendicular to lamination direction x and width direction y. Preferably, for example, laminate 12 includes curved corners and ridges. Note that the corners refer to portions of laminate 12 at which adjacent three surfaces of the laminate 12 join. The ridges refer to portions of laminate 12 at which adjacent two surfaces of the laminate 12 join. Moreover, some or all of first primary surface 12a and second primary surface 12b, first side surface 12c and second side surface 12d, and first end surface 12e and second end surface 12f may be uneven surfaces. Furthermore, the dimension of laminate 12 in longitudinal direction z is not always longer than the dimension of laminate 12 in width direction y.

Preferably, for example, the number of dielectric layers 14, including the outer layers, is about 10 or more layers and about 2000 or less layers.

Laminate 12 includes outer layer portions 15a each including multiple dielectric layers 14, and an inner layer portion 15b including one or more dielectric layers 14 and multiple inner electrode layers 16, each inner electrode layer 16 being provided on each dielectric layer 14. Outer layer portions 15a are located one on the first primary surface 12a side and another one on the second primary surface 12b side of laminate 12. Outer layer portions 15a are an aggregation of dielectric layers 14 between first primary surface 12a and inner electrode layer 16 closest to the first primary surface 12a and dielectric layers 14 between second primary surface 12b and inner electrode layer 16 closest to the second primary surface 12b. Inner layer portion 15b is the region between outer layer portions 15a.

The dimensions of laminate 12 are not particularly limited. However, preferably, for example, the dimension of laminate 12 in longitudinal direction z is about 0.2 mm or greater and about 10 mm or less, the dimension in width direction y is about 0.1 mm or greater and about 10 mm or less, and the dimension of laminate 12 in lamination direction x is about 0.1 mm or greater and about 5 mm or less.

Dielectric layer 14 may be made of, for example, a dielectric material. A dielectric ceramic that includes a component, for example, $BaTiO_3$, $CaTiO_3$, $SrTiO_3$, or $CaZrO_3$, can be used as such a dielectric material. If the above dielectric material is included as a main component of dielectric layer 14, for example, Mn compound, Fe compound, Cr compound, Co compound, Ni compound, etc., may be added as a minor component whose content is less than the main component, depending on desired characteristics of laminate 12.

Preferably, for example, fired dielectric layer 14 has a thickness greater than or equal to about 0.5 μm and less than or equal to about 10.0 μm.

As multiple inner electrode layers 16, laminate 12 includes multiple first inner electrode layers 16a and multiple second inner electrode layers 16b which have rectangular or substantially rectangular shapes. First inner electrode layers 16a and second inner electrode layers 16b are alternately embedded in laminate 12, equally or substantially equally spaced apart from one another along lamination direction x of laminate 12.

First inner electrode layer 16a includes a first opposing electrode portion 18a facing the second inner electrode layers 16b, and a first extraction electrode portion 20a that is located at one end of first inner electrode layer 16a and extends from first opposing electrode portion 18a to first end surface 12e of laminate 12. An end of first extraction electrode portion 20a is extracted to and exposed at first end surface 12e.

Second inner electrode layer 16b includes a second opposing electrode portion 18b facing the first inner electrode layers 16a, and a second extraction electrode portion 20b that is located at one end of second inner electrode layers 16b and extends from second opposing electrode portion 18b to second end surface 12f of laminate 12. An end of second extraction electrode portion 20b is extracted to and exposed at second end surface 12f.

Preferably, for example, the shapes of first opposing electrode portion 18a of first inner electrode layer 16a and second opposing electrode portion 18b of second inner electrode layer 16b are, but not particularly limited to, rectangular or substantially rectangular. First opposing electrode portion 18a and second opposing electrode portion 18b may have curved corners or tapered corners.

Preferably, for example, the shapes of first extraction electrode portion 20a of first inner electrode layer 16a and second extraction electrode portion 20b of second inner electrode layer 16b are, but not particularly limited to, rectangular or substantially rectangular. First extraction electrode portion 20a and second extraction electrode portion 20b may have curved corners or tapered corners.

First opposing electrode portion 18a of first inner electrode layer 16a and first extraction electrode portion 20a of first inner electrode layer 16a may have the same or substantially the same width or either one of them may have a narrower width than the other. Similarly, second opposing electrode portion 18b of second inner electrode layer 16b and second extraction electrode portion 20b of second inner electrode layer 16b may have the same or substantially the same width or either one of them may have a narrower width than the other.

Laminate 12 includes a side portion (W gap) 22a provided: between first side surface 12c and one ends of first opposing electrode portion 18a and second opposing electrode portion 18b in width direction y; and between second side surface 12d and the other ends of first opposing electrode portion 18a and second opposing electrode portion 18b in width direction y. Laminate 12 further includes an end portion (L gap) 22b provided: between second end surface 12f and the end portions of first inner electrode layers 16a opposite the first extraction electrode portion 20a; and between first end surface 12e and the end portions of second inner electrode layers 16b opposite the second extraction electrode portion 20b.

Inner electrode layer 16 includes an appropriate conductive material including, for example, Ni, Cu, Ag, Pd, Au, etc., or an alloy, which includes at least one of these metals, for example, Ag—Pd alloy. Preferably, for example, ethyl cellulose or acrylic resin is included as a resin component for the conductive paste for inner electrode to form inner electrode layers 16.

Preferably, for example, inner electrode layers 16 have a thickness greater than or equal to about 0.2 μm and less than or equal to about 2.0 μm. Preferably, for example, the number of inner electrode layers 16 is about ten or more layers or about 2000 or less layers.

First regions 19a and second regions 19b are provided in first inner electrode layers 16a and second inner electrode layers 16b. The coverage of first inner electrode layers 16a to dielectric layers 14 is large in first regions 19a. The coverage of second inner electrode layers 16b to dielectric layers 14 is small in second regions 19b. If first regions 19a and second regions 19b are provided in first inner electrode layers 16a and second inner electrode layers 16b, second regions 19b, in which the coverage of first inner electrode layers 16a to dielectric layers 14 is low, are able to promote the adhesion between the upper and lower dielectric layers 14, thus reducing or preventing a structural defect, for example, delamination, and reducing or preventing a significant reduction of acquired capacitance.

In multilayer ceramic capacitor 10, first regions 19a and second regions 19b are irregular in first inner electrode layers 16a and second inner electrode layers 16b.

If first regions 19a and second regions 19b are irregular in first inner electrode layers 16a and second inner electrode layers 16b, first regions 19a and second regions 19b are able to disperse the difference in compression and expansion between dielectric layers 14 and inner electrode layers 16, and second regions 19b, in which the coverage of first inner electrode layers 16a to dielectric layers 14 is low, are able to promote the adhesion between the upper and lower dielectric layers 14, thus reducing or preventing a structural defect, for example, delamination, and reducing or preventing a significant reduction of acquired capacitance.

Note that, preferably, for example, first regions 19a and second regions 19b are scattered across the first inner electrode layers 16a and second inner electrode layers 16b, without overlapping one another. Stated differently, preferably, for example, first regions 19a and second regions 19b are provided spaced apart from one another and evenly or substantially evenly distributed across first inner electrode layers 16a and second inner electrode layers 16b. Due to this, there is one region in which the coverage of first inner electrode layers 16a to dielectric layers 14 is low in a certain area and the bonding region of upper and lower dielectric layers 14 is ensured, thus further reducing or preventing a structural defect, for example, delamination.

A method of measuring the coverages of first inner electrode layers 16a and second inner electrode layers 16b in the middle portion of laminate 12 in lamination direction x to dielectric layers 14 is described below.

Initially, inner electrode layer 16 and dielectric layer 14 in the middle portion of laminate 12 in lamination direction x are delaminated by electrolytic peeling, for example.

Next, a vicinity of the middle portion of the exposed inner electrode layer 16 (the location of half the dimension in width direction y and half the dimension in longitudinal direction z) is observed via a microscope at 100× magnification. Then, a resultant image is analyzed to determine the percentage of the area of the exposed portion occupied by inner electrode layer 16. This measurement is performed in first regions 19a and second regions 19b.

Preferably, for example, the coverage of inner electrode layers 16 to dielectric layers 14 in first regions 19a is about 75% or greater, and, in particular, about 75% or greater and about 95% or less.

This is because if the coverage of inner electrode layers 16 to dielectric layers 14 in first regions 19a is less than about 75%, the coverage is low. This is advantageous for structural defects at the interface, for example, delamination, but may cause a reduction of acquired capacitance.

If the coverage of inner electrode layers 16 to dielectric layers 14 in first regions 19a is greater than about 95%, the adhesion between the upper and lower dielectric layers 14 decreases, which may cause a structural defect, for example, delamination, to occur.

Preferably, for example, the coverage of inner electrode layers 16 to dielectric layers 14 in second regions 19b is less than about 74%, and, in particular, about 30% or greater and about 70% or less.

This is because if the coverage of inner electrode layers 16 to dielectric layers 14 in second regions 19b is about 30% or greater and about 70% less, the adhesion between the upper and lower dielectric layers 14 is able to be promoted in the region in which the coverage of first inner electrode layers 16a to dielectric layers 14 is low. Thus, a structural defect, for example, delamination, is able to be reduced or prevented.

If the coverage of inner electrode layers 16 to dielectric layers 14 in second regions 19b is less than about 30%, the adhesion between the upper and lower dielectric layers 14 is increased in the region in which the coverage of first inner electrode layers 16a to dielectric layers 14 is low. This is advantageous for structural defects but may cause a reduction of acquired capacitance due to the continuous drop in the coverage.

If the coverage of inner electrode layers 16 to dielectric layers 14 in second regions 19b is greater than about 70%, the adhesion between the upper and lower dielectric layers 14 is reduced in the region in which the coverage of inner electrode layers 16 to dielectric layers 14 is low. Thus, a structural defect at the interface, for example, delamination, may occur.

Note that the second regions each preferably have, for example, a diameter within a range of about 70 µm or greater and about 120 µm or less.

External electrode 24 is provided on first end surface 12e and second end surface 12f of laminate 12. External electrode 24 includes a first external electrode 24a and a second external electrode 24b.

First external electrode 24a is provided on first end surface 12e of laminate 12, extending from first end surface 12e, and partially covering first primary surface 12a, second primary surface 12b, first side surface 12c, and second side surface 12d. In this case, first external electrode 24a is electrically connected to first extraction electrode portions 20a of first inner electrode layers 16a. Note that first external electrode 24a may be provided only on first end surface 12e of laminate 12.

Second external electrode 24b is provided on second end surface 12f of laminate 12, extending from second end surface 12f, and partially covering first primary surface 12a, second primary surface 12b, first side surface 12c, and second side surface 12d. In this case, second external electrode 24b is electrically connected to second extraction electrode portions 20b of second inner electrode layers 16b. Note that second external electrode 24b may be provided only on second end surface 12f of laminate 12.

Within laminate 12, first opposing electrode portion 18a of first inner electrode layer 16a and second opposing electrode portion 18b of second inner electrode layer 16b face each other with dielectric layers 14 in between, and a capacitance is thereby produced. Accordingly, the capacitance is able to be obtained between first external electrode 24a electrically connected to first inner electrode layers 16a and second external electrode 24b electrically connected to second inner electrode layers 16b, so as to provide the characteristics of the capacitor.

Figure 4A:
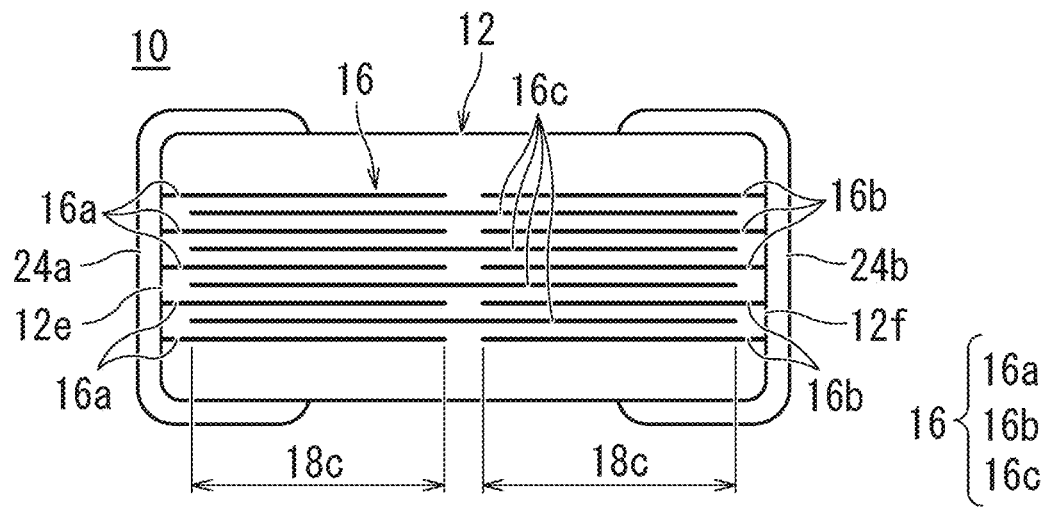
FIG. 4A is a cross-sectional view of the multi-layer ceramic capacitor according to the preferred embodiment of the present invention, taken along II-II line of FIG. 1, showing a structure in which an opposing electrode portion formed of inner electrode layers is divided into two.
Figure 4B:
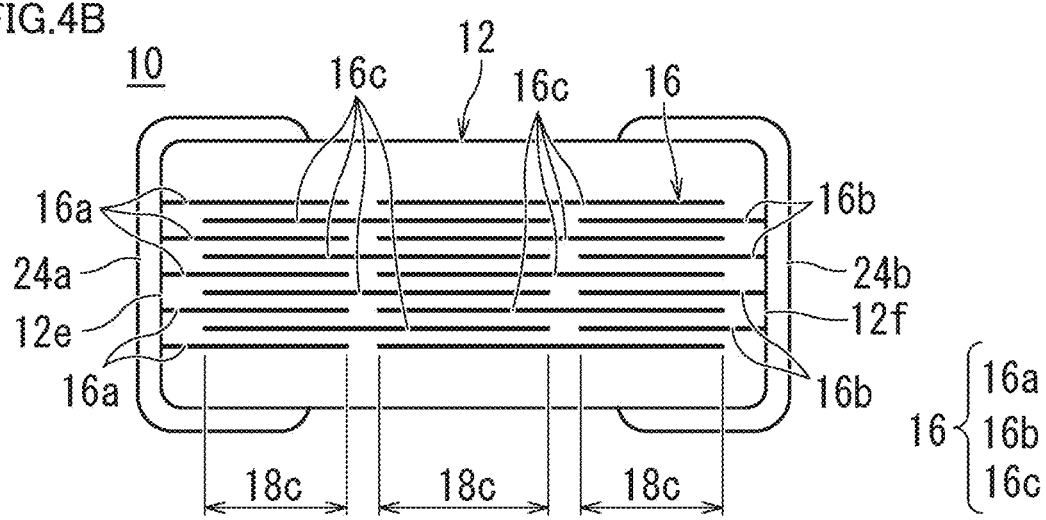
FIG. 4B is a cross-sectional view of the multilayer ceramic capacitor according to the preferred embodiment of the present invention, taken along II-II line of FIG. 1, showing a structure in which the opposing electrode portion formed of inner electrode layers is divided into three.
Figure 4C:
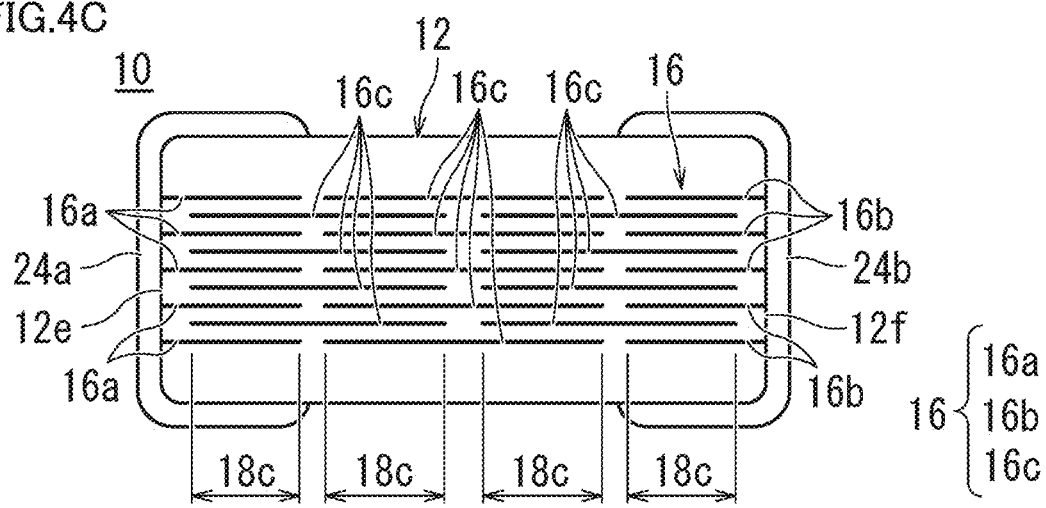
FIG. 4C is a cross-sectional view of the multilayer ceramic capacitor according to the preferred embodiment of the present invention, taken along II-II line of FIG. 1, showing a structure in which the opposing electrode portion formed of inner electrode layers is divided into four.
Figure 5:
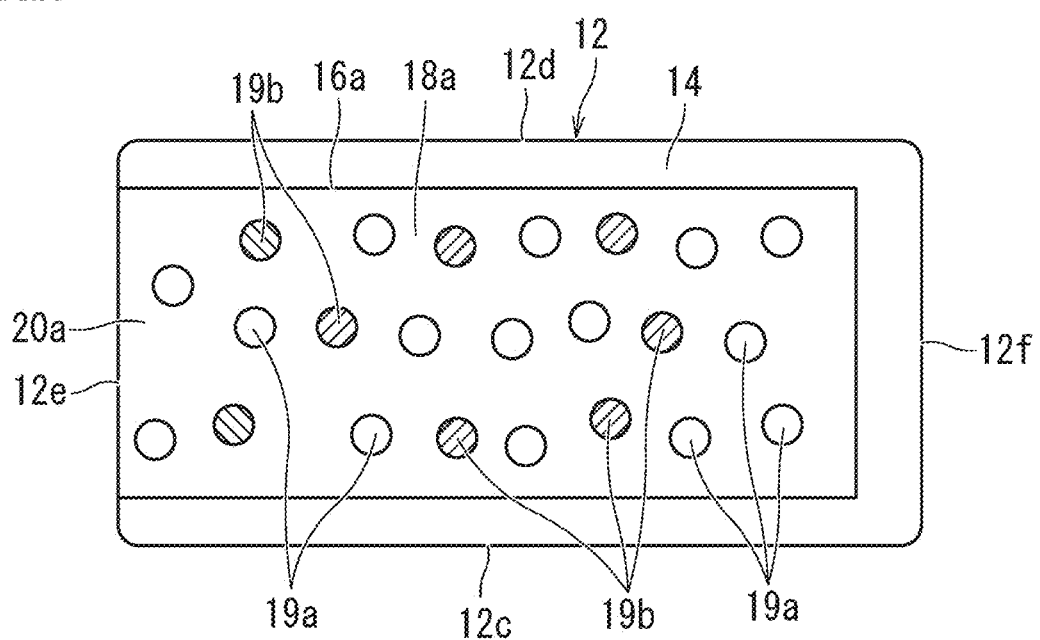
FIG. 5 is a plan view of a first inner electrode layer and a dielectric layer included in the multilayer ceramic capacitor according to a preferred embodiment of the present invention.

Note that, as shown in FIGS. 4A to 4C, floating-inner electrode layers 16c that are extracted to neither first end surface 12e nor second end surface 12f may be provided as inner electrode layers 16, in addition to first inner electrode layers 16a and second inner electrode layers 16b, and an opposing electrode portion 18c may be divided into multiple portions by floating-inner electrode layers 16c. Accordingly, for example, opposing electrode portion 18c may have a pair structure as shown in FIG. 4A, a triad structure as shown in FIG. 4B, a tetrad structure as shown in FIG. 4C, or a structure greater than a tetrad. As such, opposing electrode portion 18c being divided into multiple portions causes formation of multiple capacitor components between opposing inner electrode layers 16a, 16b, and 16c, and these capacitor components are electrically connected in series. Due to this, a reduced voltage is applied to each capacitor component, providing an increased withstand voltage of the multilayer ceramic capacitor.

First external electrode 24a includes a first underlying electrode layer 26a on laminate 12 and a first plating layer 28a on first underlying electrode layer 26a, as shown in FIG. 2. Similarly, second external electrode 24b has a second underlying electrode layer 26b on laminate 12 and a second plating layer 28b on second underlying electrode layer 26b.

First underlying electrode layer 26a is provided on first end surface 12e of laminate 12, extending from first end surface 12e to partially cover first primary surface 12a, second primary surface 12b, first side surface 12c, and second side surface 12d.

Second underlying electrode layer 26b is provided on second end surface 12f of laminate 12, extending from second end surface 12f to partially cover first primary surface 12a, second primary surface 12b, first side surface 12c, and second side surface 12d.

Note that first underlying electrode layer 26a may be provided only on first end surface 12e of laminate 12, and second underlying electrode layer 26b may be provided only on second end surface 12f of laminate 12.

First underlying electrode layer 26a and second underlying electrode layer 26b (hereinafter, also simply referred to as an underlying electrode layer) each include at least one layer selected from among a baked layer, a conductive resin layer, a thin film layer, etc., for example.

Initially, first underlying electrode layer 26a and second underlying electrode layer 26b that are baked layers will be described.

The baked layer includes glass and metal. The metal included in the baked layer preferably includes, for example, at least one metal selected from among, for example, Cu, Ni, Ag, Pd, Ag—Pd alloy, Au, etc. The glass included in the baked layer preferably includes, for example, at least one glass selected from among B, Si, Ba, Mg, Al, Li, etc. The baked layer may have a multi-layer structure. The baked layer is provided by baking laminate 12 having a conductive paste including the glass and metal applied thereto. The baked layer may be fired simultaneously with dielectric layers 14 and inner electrode layers 16 or fired after dielectric layers 14 and inner electrode layers 16 are baked.

Preferably, for example, the thickness of the baked layer in the middle portion of first underlying electrode layer 26a on first end surface 12e in the height direction and the thickness of the baked layer in the middle portion of second underlying electrode layer 26b on second end surface 12f in the height direction are about 5 µm or greater and about 150 µm or less.

If the underlying electrode layer is provided on first primary surface 12a and second primary surface 12b and first side surface 12c and second side surface 12d, preferably, for example, the thickness of the baked layer in the middle portion of first underlying electrode layer 26a and second underlying electrode layer 26b on first primary surface 12a and second primary surface 12b and first side surface 12c and second side surface 12d in the longitudinal direction is about 5 µm or greater and about 30 µm or less.

Next, first underlying electrode layer 26a and second underlying electrode layer 26b that are conductive resin layers will be described.

The conductive resin layer may be provided on the baked layer to cover the baked layer or provided directly on laminate 12.

The conductive resin layer includes a thermosetting resin and a metal. Since the conductive resin layer includes a thermosetting resin, the conductive resin layer is more flexible than a conductive layer formed of, for example, a plating film or a fired conductive paste. Due to this, even in the event of a physical impact or an impact attributed to heat cycles on the multilayer ceramic capacitor, the conductive resin layer defines and functions as a buffer layer, thus significantly reducing or preventing cracks from occurring in the multilayer ceramic capacitor.

Ag, Cu, or alloys thereof, for example, are able to be included as the metal included in the conductive resin layer. Ag-coated metal powder is able to also be included. When Ag-coated metal powder is included, preferably, for example, the metal powder is Cu or Ni. Alternatively, Cu having through anti-oxidation treatment is able to be included. In particular, conductive metal powder including Ag is preferable used as the metal included in the conductive resin layer, for example, because Ag has the lowest specific resistance among metals and is thus suitable as the electrode material, and also Ag, because it is a precious metal, does not undergo oxidation and is weather resistant. Note that the use of the Ag-coated metal as the metal included in the conductive resin layer is preferable, for example, because it is able to significantly reduce the cost for the metal of the base material of the conductive resin layer, while maintaining the above characteristics of Ag.

Preferably, for example, the metal included in the conductive resin layer is about 35 vol % or greater and about 75 vol % or less relative to the overall volume of the conductive resin.

The shape of the metal (conductive fillers) included in the conductive resin layer is not particularly limited. While the conductive fillers may have a sphere shape, or a flat shape, preferably, for example, spherical metal powder and flat metal powder are used in combination.

An average particle size of the metal (the conductive fillers) included in the conductive resin layer is not particularly limited. The average particle size of the conductive fillers may preferably be, for example, about 0.3 μm or greater and about 10 μm or less.

The metal (the conductive fillers) included in the conductive resin layer is primarily responsible for the current carrying properties of the conductive resin layer. Specifically, as the conductive fillers come into contact, a current-carrying path is provided within the conductive resin layer.

For example, well-known various thermosetting resins, such as an epoxy resin, phenolic resin, urethane resin, silicone resin, polyimide resin, are able to be used as the resin for the conductive resin layer. Among others, epoxy resin having excellent heat resistance, moisture resistance, adhesion, etc., for example, is one of the most suitable resins.

Preferably, for example, the resin included in the conductive resin layer is about 25 vol % or greater and about 65 vol % or less relative to the overall volume of the conductive resin.

Preferably, for example, the conductive resin layer includes a curing agent in addition to the thermosetting resin. If the epoxy resin is used as the base resin, a phenolic resin or well-known various compounds, for example, an amine-based compound, an anhydride-based compound, an imidazole-based compound, etc. may be used as the curing agent of the epoxy resin.

Preferably, for example, the thickness of the conductive resin layer in the middle portion of first underlying electrode layer 26a on first end surface 12e in the height direction, and the thickness of the conductive resin layer in the middle portion of second underlying electrode layer 26b on second end surface 12f in the height direction are, for example, about 10 μm or greater and about 200 μm or less.

If the underlying electrode layer is provided on first primary surface 12a and second primary surface 12b and first side surface 12c and second side surface 12d, preferably, for example, the thickness of the conductive resin layer in the middle portion of first underlying electrode layer 26a and second underlying electrode layer 26b on first primary surface 12a and second primary surface 12b and first side surface 12c and second side surface 12d in the longitudinal direction is about 5 μm or greater and about 50 μm or less.

If the underlying electrode layers are thin film layers, the thin film layers are formed by a thin-film formation method, for example, sputtering or deposition. The thin film layers each have metal particles deposited thereon and have a thickness of about 1 μm or less.

First plating layer 28a covers first underlying electrode layer 26a. Specifically, preferably, for example, first plating layer 28a is provided on first underlying electrode layer 26a on first end surface 12e, and extends to first primary surface 12a, second primary surface 12b, first side surface 12c, and second side surface 12d on first underlying electrode layer 26a. Note that first plating layer 28a may be provided only on first underlying electrode layer 26a on first end surface 12e.

Second plating layer 28b covers second underlying electrode layer 26b. Specifically, preferably, for example, second plating layer 28b is provided on second underlying electrode layer 26b on second end surface 12f, and extends to first primary surface 12a, second primary surface 12b, first side surface 12c, and second side surface 12d on second underlying electrode layer 26b. Note that second plating layer 28b may be provided only on second underlying electrode layer 26b on second end surface 12f.

First plating layer 28a and second plating layer 28b (hereinafter, also simply referred to as a plating layer) preferably include, for example, at least one metal selected from among, for example, Cu, Ni, Sn, Ag, Pd, Ag—Pd alloy, Au, etc.

The plating layer may include multiple layers. In this case, preferably, for example, the plating layer has a two-layer structure including a Ni plating layer and a Sn plating layer. If the Ni plating layer covers underlying electrode layer 24, the underlying electrode layer is able to be protected from erosion by the solder when mounting multilayer ceramic capacitor 10. Moreover, if the Sn plating layer is provided on the Ni plating layer, wettability of the solder when mounting multilayer ceramic capacitor 10 significantly improves, thus allowing readily mounting of multilayer ceramic capacitor 10.

Preferably, for example, each plating layer has a thickness of about 2 μm or greater and about 15 μm or less.

Note that external electrode 24 may include only of the plating layer, without the underlying electrode layer. In the following, a structure of external electrode 24 which includes the plating layer and no underlying electrode layer will be described. First external electrode 24a and second external electrode 24b each may include no underlying electrode layer, and the plating layer may be provided directly on laminate 12. In other words, multilayer ceramic capacitor 10 may have a structure including the plating layer that is electrically connected to first inner electrode layers 16a or second inner electrode layers 16b. In such a case, the surface of laminate 12 may be coated with a catalyst as preprocessing and the plating layer may be provided thereafter. Preferably, for example, the plating layer includes a lower plated electrode provided on laminate 12, and an upper plated electrode provided on the lower plated electrode.

Preferably, for example, the lower plated electrode and the upper plated electrode each include, for example, at least one type of metal selected from among, for example, Cu, Ni, Sn, Pb, Au, Ag, Pd, Bi, or Zn or an alloy that includes the metal.

Preferably, for example, the lower plated electrode includes Ni which has solder barrier performance. Preferably, for example, the upper plated electrode includes Sn or Au which has good solder wettability. For example, if first inner electrode layers 16a and second inner electrode layers 16b include Ni, preferably, for example, the lower plated electrode includes Cu which has good adhesion with Ni. Note that the upper plated electrode may be provided, for example. First external electrode 24a and second external electrode 24b each may be provided by only the lower plated electrode.

The plating layer may include the upper plated electrode as the outermost layer or another plated electrode may further be provided on the upper plated electrode.

Preferably, for example, the plating layer has a thickness of about 1 µm or greater and about 15 µm or less if external electrode 24 includes only the plating layer, without an underlying electrode layer. Preferably, for example, the plating layer includes no glass. Preferably, for example, the percentage of the metal per unit volume of the plating layer is about 99 vol % or greater.

L dimension refers to the dimension of multi-layer ceramic capacitor 10 in longitudinal direction z, the multilayer ceramic capacitor 10 including laminate 12, first external electrode 24a, and second external electrode 24b. T dimension refers to the dimension of multilayer ceramic capacitor 10 in lamination direction x, the multilayer ceramic capacitor 10 including laminate 12, first external electrode 24a, and second external electrode 24b. W dimension refers to the dimension of multilayer ceramic capacitor 10 in width direction y, the multilayer ceramic capacitor 10 including laminate 12, first external electrode 24a, and second external electrode 24b.

For the dimensions of multilayer ceramic capacitor 10, preferably, for example, L dimension in longitudinal direction z is about 0.250 mm or greater and about 3.450 mm or less, W dimension in width direction y is about 0.125 mm or greater and about 2.650 mm or less, and T dimension in lamination direction x is about 0.125 mm or greater and about 2.650 mm or less.

2. Method for Fabricating the Multilayer Ceramic Capacitor

Next, a non-limiting example of a method for fabricating multilayer ceramic capacitor 10 according to the preferred embodiment of the present invention will be described.

Initially, dielectric sheets and a conductive paste for inner electrode are prepared. The dielectric sheets and the conductive paste for inner electrode include a binder and a solvent. However, a well-known organic binder or organic solvent may be used.

Next, the conductive paste for inner electrode is printed in a predetermined pattern on the dielectric sheet by, for example, screen printing or gravure printing, and an inner electrode pattern is thereby formed.

In the printing of the inner electrode pattern in multilayer ceramic capacitor 10, the coverage is able to be changed through a method for changing the aperture ratio of a portion of the print pattern, a method for changing a drying temperature after the formation of the print pattern, and a method for changing the dispersibility of the co-material of a printing paste.

For example, the conductive paste for inner electrode is printed in a predetermined pattern on the dielectric sheet by, for example, screen printing or gravure printing, and an inner electrode pattern is thus formed.

In the above-described preferred embodiment of the present invention, the coverage is able to be changed through a method for changing the aperture ratio of a portion of the print pattern, a method for changing a drying temperature after the formation of the print pattern, and a method for changing the dispersibility of the co-material of a printing paste. However, in the example of a preferred embodiment of the present invention, a portion of the inner electrode layer where lower coverage is desired to be provided is printed with a print pattern in which geometric shapes having low aperture ratios are provided, as shown in FIG. 9.

Here, a method of formation of first regions 19a and second regions 19b on inner electrode layers 16 by gravure printing will be described.

Figure 7:
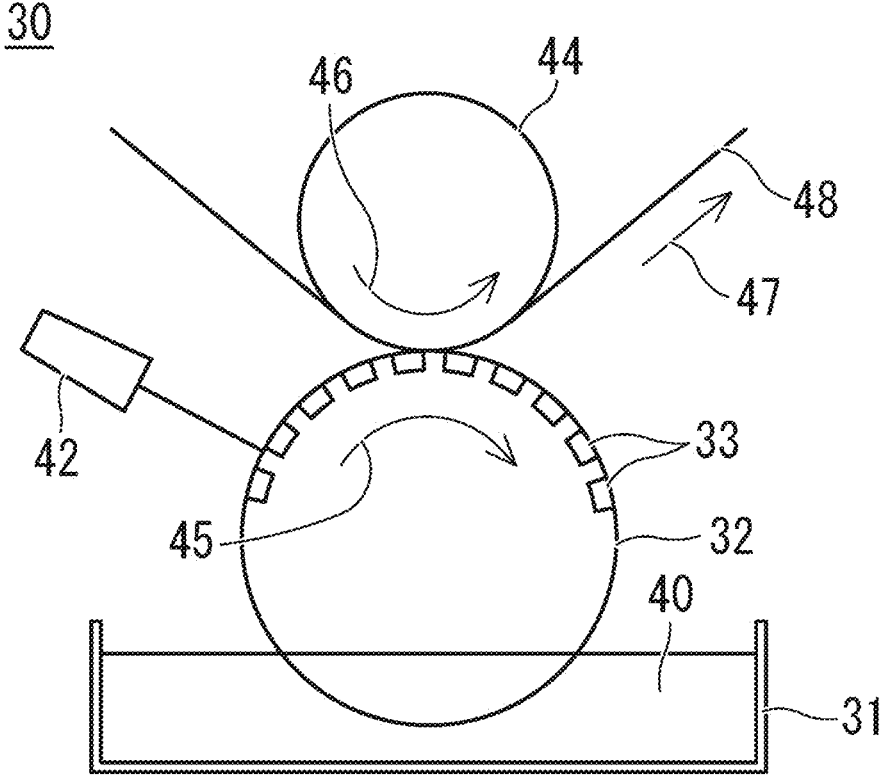
FIG. 7 is a side view showing a gravure printer.
Figure 8:
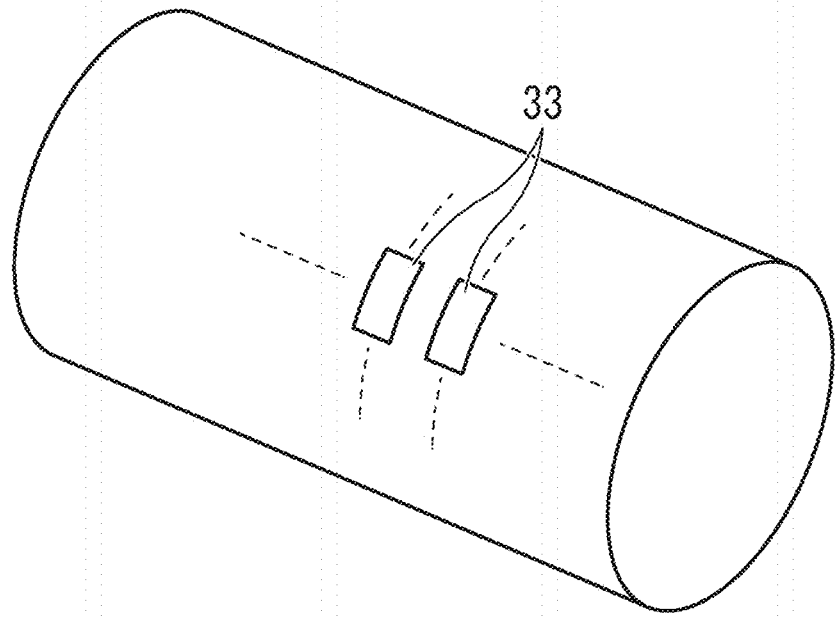
FIG. 8 is a perspective view of a plate cylinder shown in FIG. 7.

The gravure printing is performed by a gravure printer 30 including a plate cylinder 32 (cylinder) which is a gravure printing form, as shown in FIGS. 7 and 8. Plate cylinder 32 has the peripheral surface including multiple image line portions 33, which is a print pattern, provided thereon. Banks 35 and multiple recessed cells 36 partitioned by banks 35 are formed in image line portions 33. An ink 40 filled in each cell 36 is transferred onto a substrate 48. In the following, more detail will be described.

Gravure printer 30 includes plate cylinder 32 and an impression cylinder 44 facing plate cylinder 32 with a sheet substrate 48 in between.

Plate cylinder 32 and impression cylinder 44 rotate in the directions indicated by arrows 45 and 46, respectively, thus causing substrate 48 to be conveyed in the direction indicated by arrow 47.

Note that a gravure printer provided with no impression cylinder 44, as in the case of a gravure lithographic printing machine, is possible.

Plate cylinder 32 is dipped into ink 40 accommodated within a tank 31, as shown in FIG. 7, thus applying ink 40 to multiple image line portions 33 formed on the circumferential surface of plate cylinder 32.

Note that ink 40 may be supplied to plate cylinder 32 by ejecting the ink 40 to plate cylinder 32, for example.

Excess ink 40 on the circumferential surface of plate cylinder 32 is removed by a doctor blade 42.

If the gravure printing is utilized to form first regions 19a and second regions 19b in inner electrode layers 16, substrate 48 corresponds to the dielectric sheet and ink 40 corresponds to the conductive paste for inner electrode which includes the resin component.

Figure 9A:
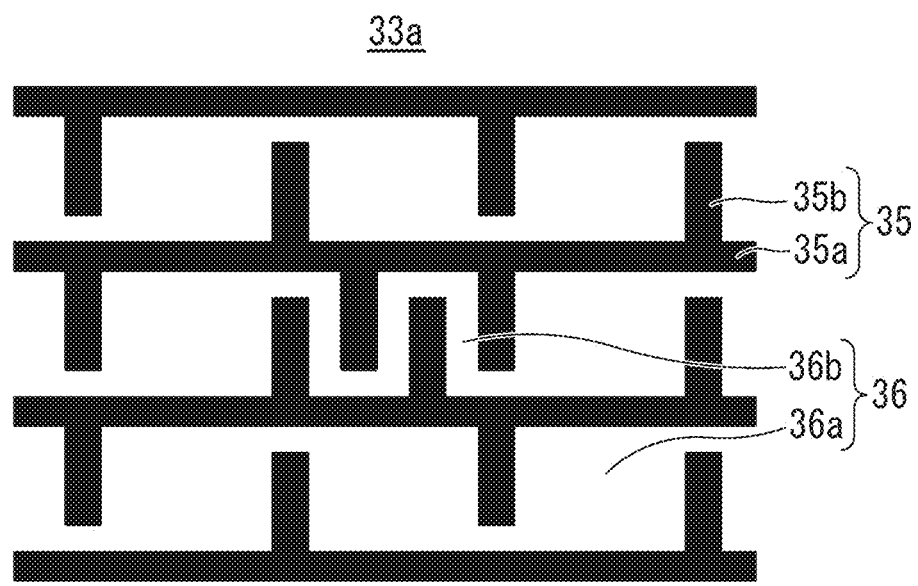
FIG. 9A is a plan view of an enlarged image line portion (print pattern), which is a checkerboard image line portion, formed on the plate cylinder shown in FIG. 8.
Figure 9B:
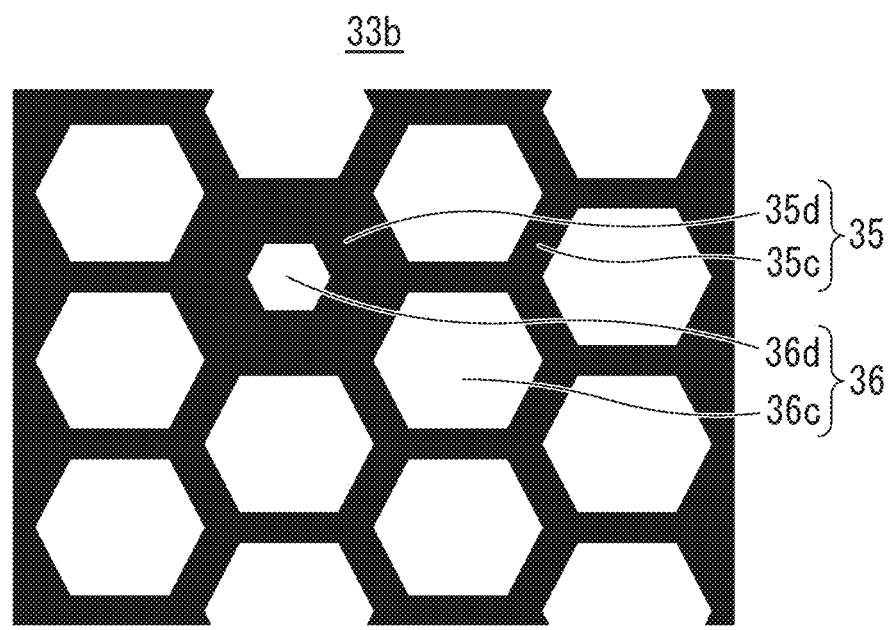
FIG. 9B is a plan view of an enlarged image line portion (print pattern), which is a hexagonal image line portion, formed on the plate cylinder shown in FIG. 8.

In order to utilize the gravure printing to form first regions 19a and second regions 19b in inner electrode layers 16, gravure printer 30 is able to be used which includes plate cylinder 32 having, for example, lattice image line portion 33a as shown in FIG. 9A or a hexagonal image line portion 33b as shown in FIG. 9B formed thereon. Note that lattice image line portion 33a shown in FIG. 9A and hexagonal image line portion 33b shown in FIG. 9B each show a portion of image line portion 33.

Initially, as a print pattern, lattice image line portion 33a shown in FIG. 9A will be described.

As shown in FIG. 9A, lattice image line portion 33a includes linear banks 35a, projecting banks 35b, first cells 36a, and second cells 36b. Linear bank 35a has a generally linear planar shape. Projecting bank 35b projects from linear bank 35a to the left and right in the plane direction and has a generally linear planar shape. First cell 36a has a rectangular or substantially rectangular, planar shape and the area of first cell 36a is increased by increasing the spacing between projecting banks 35b. Second cell 36b has a rectangular or substantially rectangular, planar shape and the area of second cell 36b is reduced less than the area of first cell 36a by reducing the spacing between projecting banks 35b. Second cell 36b is surrounded by first cells 36a.

As plate cylinder 32 having lattice image line portion 33a formed thereon is used to print the conductive paste (ink 40) for inner electrode, which is to be inner electrode layers 16, the portion of inner electrode layer 16 having the conductive paste (ink 40) for inner electrode printed thereon by first cells 36a forms first regions 19a in which the coverage is high, and the portion of inner electrode layers 16 having the conductive paste for inner electrode printed by second cells 36b forms second regions 19b in which the coverage is low.

Next, as another print pattern, hexagonal image line portion 33b shown in FIG. 9B will be described.

Hexagonal image line portion 33b includes third cells 36c each having a generally hexagonal, planar shape and fourth cells 36d each having a generally hexagonal, planar shape, as shown in FIG. 9B. Thin line banks 35c, each having a generally linear planar shape, are coupled together, thus surrounding and forming third cell 36c. Thick line banks 35d, each having a generally linear planar shape and whose length in the width direction is thicker than thin line banks 35c, are coupled together, thus surrounding fourth cell 36d. The area of fourth cell 36d is less than the area of third cell 36c. Fourth cell 36d is surrounded by third cells 36c.

As plate cylinder 32 having hexagonal image line portion 33b formed thereon is used to print the conductive paste (ink 40) for inner electrode, which is to be inner electrode layers 16, the portion of inner electrode layer 16 having the conductive paste (ink 40) for inner electrode printed by third cells 36c forms first regions 19a in which the coverage is high, and the portion of inner electrode layer 16 having the conductive paste for inner electrode printed by fourth cells 36d forms second regions 19b in which the coverage is low.

Note that first regions 19a and second regions 19b are able to be formed in inner electrode layers 16 by screen printing.

Next, a predetermined number of dielectric sheets for outer layer, having no inner electrode pattern printed thereon, are laminated one on the other, on which dielectric sheets, each having an inner electrode pattern printed thereon, are laminated in sequence, on which a predetermined number of dielectric sheets for outer layer, having no inner electrode pattern printed thereon, are further laminated. A laminated sheet is thus fabricated.

Then, the laminated sheet is compressed in the direction of lamination by, for example, a hydrostatic press, thereby fabricating a laminated block.

Subsequently, the laminated block is cut into a predetermined geometry to cleave out a raw laminated chip, at which time the corners and ridges of the raw laminated chip may be curved by tumbling, for example.

Next, the raw laminated chip, cut out from the laminated block, is fired, thus fabricating laminate 12 whose first inner electrode layers are extracted to the first end surface and second inner electrode layers are extracted to the second end surface. Note that, preferably, for example, the firing temperature for the raw laminated chip is about 900 degrees Celsius or higher and about 1400 degrees Celsius or lower, depending on the materials of the ceramic and the material of the conductive paste for inner electrode.

A method of formation of a baked layer as an underlying electrode layer will be described.

In order to form a baked layer for external electrode 24, for example, a conductive paste for external electrode, which includes a glass component and metal, is applied by a method, for example, dipping, to first extraction electrode portions 20a of first inner electrode layers 16a exposed through first end surface 12e of laminate 12, and the conductive paste is baked, thereby forming the first underlying electrode layer. Similarly, in order to form a baked layer for external electrode 24, for example, a conductive paste for external electrode, which includes a glass component and metal, is applied by a method, for example, dipping, to second extraction electrode portion 20b of second inner electrode layers 16b exposed through second end surface 12f of laminate 12, and the conductive paste is baked, thus forming the second underlying electrode layer. At this time, preferably, for example, the temperature for the baking is about 700 degrees Celsius or higher and about 900 degrees Celsius or lower.

Next, a method of formation of a conductive resin layer as the underlying electrode layer will be described.

Note that the conductive resin layer may be formed on the baked layer or may be formed directly on laminate 12, without formation of the baked layer.

As a method of formation of the conductive resin layer, a conductive resin paste, including a thermosetting resin and a metal component, is applied to the baked layer or the surface of laminate 12 and subjected to a heat treatment at about 250 degrees Celsius or higher and about 550 degrees Celsius or lower, for example, to thermally cure the resin, and the conductive resin layer is formed. Preferably, for example, the thermal treatment is conducted under a $N_2$ atmosphere. Moreover, preferably, for example, the oxygen concentration is maintained at about 100 ppm or less, for example, in order to significantly reduce or prevent the scattering of the resin and various oxidation of the metal component.

Moreover, a method of formation of a thin film layer as the underlying electrode layer will be described.

In order to form a thin film layer as the underlying electrode layer, the underlying electrode layer can be formed by a thin-film formation method, for example, sputtering or deposition. The underlying electrode layer formed of the thin film layer preferably has metal particles deposited thereon and has a thickness of about 1 μm or less, for example.

Furthermore, the plating layer may be provided at the exposed portions of inner electrode layers 16 of laminate 12, without providing the underlying electrode layer.

First end surface 12e and second end surface 12f of laminate 12 are plated to form underlying plated electrodes on the exposed portions of inner electrode layers 16. Either electroplating or electroless plating may be used for the plating. However, the electroless plating requires a preprocess with, for example, a catalyst in order to increase the plating deposition rate, ending up with an increase in complexity of the process. Accordingly, typically, the electroplating is preferable, for example. As the plating method, barrel plating is preferable, for example. Moreover, an upper plated electrode may be similarly formed on the lower plated electrode, for example.

Subsequently, the plating layer is formed on the underlying electrode layer, the conductive resin layer or underlying plating layer, and the upper plating layer, and the external electrodes 24 are formed.

As plating layers, multilayer ceramic capacitor 10, shown in FIG. 1, includes the Ni plating layer and the Sn plating layer formed on the baked layer. The Ni plating layer and the Sn plating layer are formed in sequence by, for example, barrel plating.

In this way, multilayer ceramic capacitor 10, shown in FIG. 1, is fabricated.

3. Experimental Example

Next, in order to confirm the advantageous effects of the multilayer ceramic capacitor according to the preferred embodiment of the present invention described above, the multilayer ceramic capacitor was fabricated, and the capacitance was measured and a structural defect was confirmed.

Note that, in Experimental Example, the baked layer is provided as the underlying electrode layer.

(1) Specifications of Sample in Example

Multilayer ceramic capacitor size L*W*T (including the design value): length*width*height=about 3.25 mm*about 1.65 mm*about 1.65 mm
Dielectric layer: $CaZrO_3$
Thickness of dielectric layer: about 2.5 μm
Inner electrode layer: Ni
Conditions of Inner Electrode Layer Formation
In the example of the above-described preferred embodiment of the present invention, the changes in coverage in the respective regions were controlled by changing the print pattern (the image line portion) for the portion of the inner electrode layer whose coverage is desired to be lower, to the print pattern (the image line portion) in which geometric shapes (the cells) having small areas are provided as shown in FIG. 9A or FIG. 9B.
Coverage Information
  First region: about 87%
  Second region: about 65%
  Capacitance: about 101 nF
  Rated voltage: 50V
  External electrode structure
  Underlying electrode layer: Electrode including a conductive metal (Cu) and a glass component
  Thickness in the middle portion of the first end surface and the second end surface in the height direction in the cross section of the laminate at ½W: about 75 μm
  Thickness in the middle portion of the first primary surface and the second primary surface and the first side surface and the second side surface in the longitudinal direction in the cross section of the laminate at ½W: about 23 μm
Plating layer: Two-layer formation consisting of the Ni plating layer and the Sn plating layer
Ni plating layer:
  Thickness in the middle portion of the first end surface and the second end surface in the height direction in the cross section of the laminate at ½W: about 3.3 μm
  Thickness in the middle portion of the first primary surface, the second primary surface, the first side surface, and the second side surface in the longitudinal direction in the cross section of the laminate at ½W: about 3.3 μm
Sn plating layer:
  Thickness in the middle portion of the first end surface and the second end surface in the height direction in the cross section of the laminate at ½W: about 3.5 μm
  Thickness in the middle portion of the first primary surface, the second primary surface, the first side surface, and the second side surface in the longitudinal direction in the cross section of the laminate at ½W: about 3.5 μm

(2) Specifications of Sample in Comparative Example 1

Multilayer ceramic capacitor size L*W*T (including the design value): length*width*height=about 3.25 mm*about 1.65 mm*about 1.65 mm
Dielectric layer: $CaZrO_3$
Thickness of dielectric layer: about 2.5 μm
Inner electrode layer: Ni
Conditions of Inner Electrode Layer Formation
  Print pattern (the image line portion) having no geometric shapes that have low aperture ratios, was printed.
Coverage Information
  First region: about 88%
  Second region: about 86%
  Capacitance: about 105.3 nF
  Rated voltage: 50V
  External electrode structure
  Underlying electrode layer: Electrode including a conductive metal (Cu) and a glass component
  Thickness in the middle portion of the first end surface and the second end surface in the height direction in the cross section of the laminate at ½W: about 75 μm
  Thickness in the middle portion of the first primary surface, the second primary surface, the first side surface, and the second side surface in the longitudinal direction in the cross section of the laminate at ½W: about 23 μm
Plating layer: Two-layer formation consisting of the Ni plating layer and the Sn plating layer
Ni plating layer:
  Thickness in the middle portion of the first end surface and the second end surface in the height direction in the cross section of the laminate at ½W: about 3.3 μm
  Thickness in the middle portion of the first primary surface, the second primary surface, the first side surface, and the second side surface in the longitudinal direction in the cross section of the laminate at ½W: about 3.3 μm
Sn plating layer:
  Thickness in the middle portion of the first end surface and the second end surface in the height direction in the cross section of the laminate at ½W: about 3.5 μm
  Thickness in the middle portion of the first primary surface, the second primary surface, the first side surface, and the second side surface in the longitudinal direction in the cross section of the laminate at ½W: about 3.5 μm

(3) Specifications of Sample in Comparative Example 2

Multilayer ceramic capacitor size L*W*T (including the design value): length*width*height=about 3.25 mm*about 1.65 mm*about 1.65 mm
Dielectric layer: $CaZrO_3$
Thickness of dielectric layer: about 2.5 μm
Inner electrode layer: Ni
Conditions of Inner Electrode Layer Formation
Print pattern (the image line portion) only having geometric shapes that have low aperture ratios, was printed.
Coverage Information
First region: about 65%
Second region: about 60%
Capacitance: about 77.2 nF
Rated voltage: 50V
External electrode structure
Underlying electrode layer: Electrode including a conductive metal (Cu) and a glass component
Thickness in the middle portion of the first end surface and the second end surface in the height direction in the cross section of the laminate at ½W: about 75 μm
Thickness in the middle portion of the first primary surface, the second primary surface, the first side surface, and the second side surface in the longitudinal direction in the cross section of the laminate at ½W: about 23 μm
Plating layer: Two-layer formation consisting of the Ni plating layer and the Sn plating layer
Ni plating layer:
  Thickness in the middle portion of the first end surface and the second end surface in the height direction in the cross section of the laminate at ½W: about 3.3 μm
  Thickness in the middle portion of the first primary surface and the second primary surface and the first side surface and the second side surface in the longitudinal direction in the cross section of the laminate at ½W: about 3.3 μm
Sn plating layer:
  Thickness in the middle portion of the first end surface and the second end surface in the height direction in the cross section of the laminate at ½W: about 3.5 μm
  Thickness in the middle portion of the first primary surface and the second primary surface and the first side surface and the second side surface in the longitudinal direction in the cross section of the laminate at ½W: about 3.5 μm

(4) Method of Measurement of the Coverage

A method of measurement of the coverage will be described.

A method of measurement of the coverages of the first inner electrode layer and the second inner electrode layer in the middle portion of the laminate in the height direction to the dielectric layer, is described below.

Initially, the inner electrode layer and the dielectric layer located in the middle portion of the laminate in the height direction were delaminated from each other by electrolytic peeling, for example.

Next, a vicinity of the middle portion of the exposed inner electrode layer (the location of half the dimension in width direction y and half the dimension in longitudinal direction z) was observed via a microscope at 100× magnification.

Then, a resultant image was analyzed to determine the percentage of the area of the exposed portion occupied by the inner electrode layer.

(5) Method of Confirmation of the Capacitance

As a method of measurement of the capacitance (Cap), capacitance (C) provided under conditions of about 1 kHz and about 0.5 Vrms was measured, by a meter (by Agilent Technologies, Model: 4278A). The evaluation criteria with respect to good, average, and poor was determined according to the capacitance being about 90 nF or greater is good, greater than about 80 nF and less than 90 about nF is average, and 80 about nF or less is poor.

(6) Method of Confirmation of a Structural Defect

As a method of confirmation of a structural defect, initially, the multilayer ceramic capacitors, which are samples, were polished by cross-section polishing to reveal a cross section at about ½W in width direction y connecting the first side surface and the second side surface so that the cross section is in parallel or substantially in parallel with the first side surface and the second side surface of the multilayer ceramic capacitor.

Next, the cross sections revealed by the polishing were observed, and samples having delamination between the dielectric layer and the inner electrode layer were counted as a structural defect. A sample having no structural defect was evaluated as good. A sample having one to five structural defects was evaluated as average. A sample having more than five structural defects was evaluated as poor.

(7) Results of Experiment

Results of the experiment are described.

Table 1 shows results of the experiment with respect to the capacitance and structural defect with varying coverages of the layers in the first region and the second region.

TABLE 1

| | 1st region Coverage[%] | 2nd region Coverage[%] | Capacitance Capacity[nF] | Capacitance Evaluation | Structural defect Count | Structural defect Evaluation | Comprehensive evaluation |
|---|---|---|---|---|---|---|---|
| Comparative Example 1 | 88 | 86 | 98.6 | Good | 9/10 | Poor | Poor |
| Comparative Example 2 | 65 | 60 | 77.8 | Poor | 0/10 | Good | Poor |
| Example 1 | 80 | 65 | 102.0 | Good | 0/10 | Good | Good |
| Example 2 | 75 | 20 | 89.2 | Average | 0/10 | Good | Average |
| Example 3 | 75 | 34 | 91.4 | Good | 0/10 | Good | Good |
| Example 4 | 75 | 70 | 97.0 | Good | 0/10 | Good | Good |
| Example 5 | 75 | 74 | 97.7 | Good | 2/10 | Average | Average |

TABLE 1-continued

| | 1st region Coverage[%] | 2nd region Coverage[%] | Capacitance Capacity[nF] | Capacitance Evaluation | Structural defect Count | Structural defect Evaluation | Comprehensive evaluation |
|---|---|---|---|---|---|---|---|
| Example 6 | 95 | 20 | 95.8 | Good | 3/10 | Average | Average |
| Example 7 | 95 | 30 | 97.4 | Good | 0/10 | Good | Good |
| Example 8 | 95 | 70 | 103.6 | Good | 0/10 | Good | Good |
| Example 9 | 95 | 74 | 104.3 | Good | 1/10 | Average | Average |
| Example 10 | 98 | 65 | 105.8 | Good | 3/10 | Average | Average |

In Comparative Example 1, the coverage in the first region is about 88% and the coverage in the second region is about 86%. The coverages in both regions are great and thus nine out of ten samples have any structural defect, suggesting that the structural defects, for example, delamination, occurred associated with a reduction of the adhesion between the upper and lower dielectric layers.

In Comparative Example 2, the coverage in the first region is about 65% and the coverage in the second region is about 60%. The coverages in both regions are low and thus no structural defect, for example, delamination, occurred. However, due to the low coverages, the capacitance is about 77.8 pF, causing a reduction of acquired capacitance.

This reveals that the coverage in the first region and the coverage in the second region according to Comparative Examples 1 and 2 are inappropriate.

In contrast, the coverage in the first region and the coverage in the second region are low in Examples 1 through 10. As a result, a predetermined capacitance was provided and a predetermined number or more of structural defects did not occur. Particularly with the samples in Examples 1 through 10, the coverage in the first region is about 75% or greater and the coverage in the second region is less than about 75%. As a result, desired capacitances were provided and a predetermined number or more of structural defect did not occur.

Moreover, with the samples used in Example 1, Example 3, Example 4, Example 7, and Example 8, the coverage in the first region is about 75% or greater and about 95% or less, and the coverage in the second region is about 30% or greater and about 70% or less. Thus, capacitance equal to or greater than about 90 nF was provided and no structural defect occurred in all the examples.

Note that the acquired capacitance somewhat decreased in Example 2 because the coverage in the second region is as small as about 20%. In Example 5, the coverage in the second region is about 74%, and thus the adhesion between the upper and lower dielectric layers somewhat reduced. As a result, in two out of ten samples, structural defects occurred. In Example 6, the coverage in the first region is large, and thus a desired capacitance was provided. However, since the coverage in the second region contributing to enhancement of the adhesion is small, in three out of ten samples, structural defects occurred. In Example 9, the coverage in the second region is about 74%, and thus the adhesion between the upper and lower dielectric layers somewhat reduced. As a result, in one out of ten samples, structural defects occurred. In Example 10, since the coverage in the first region is as large as about 98%, the adhesion between the upper and lower dielectric layers somewhat reduced. As a result, in three out of ten samples, structural defects occurred. However, all the samples in Example 2, Example 5, Example 6, Example 9, and Example 10 have acquired predetermined capacitances, and structural defects occurred in a small number of samples. Thus, the samples are satisfactorily in terms of the yield rate in the manufacturing process.

While the above-described preferred embodiment of the present invention has been disclosed in the above description, it should be noted that the present invention is not limited thereto.

In other words, various changes can be made to the above-described preferred embodiment with respect to the mechanism, the shape, the material, the number, the position, the arrangement, etc., without departing from the scope of the technical idea and object of the present invention. These changes are within the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor, comprising:
   a laminate which includes a plurality of dielectric layers that are laminated, the laminate including a first primary surface and a second primary surface facing each other in a lamination direction in which the plurality of dielectric layers are laminated, a first side surface and a second side surface facing each other in a width direction of the laminate perpendicular or substantially perpendicular to the lamination direction, and a first end surface and a second end surface facing each other in a longitudinal direction of the laminate perpendicular or substantially perpendicular to the lamination direction and the width direction;
   a first inner electrode layer provided on the dielectric layer, the first inner electrode layer being exposed through the first end surface;
   a second inner electrode layer provided on the dielectric layer, the second inner electrode layer being exposed through the second end surface;
   a first external electrode provided on the first end surface, the first external electrode being electrically connected to the first inner electrode layer; and
   a second external electrode provided on the second end surface, the second external electrode being electrically connected to the second inner electrode layer; wherein
   the first inner electrode layer and the second inner electrode layer, provided on the dielectric layer, each include a first region and a second region which are irregular;
   a coverage of the first inner electrode layer to the dielectric layer in the first region is greater than a coverage of the first inner electrode layer to the dielectric layer in the second region;
   a coverage of the second inner electrode layer to the dielectric layer in the first region is greater than a coverage of the second inner electrode layer to the dielectric layer in the second region;

the first region of each of the first inner electrode layer and the second inner electrode layer includes a plurality of first apertures, and the second region of each of the first inner electrode layer and the second inner electrode layer includes a plurality of second apertures different from the plurality of first apertures; and when viewed in the lamination direction, a total surface area of the plurality of first apertures in the first region of the first inner electrode layer is less than a total surface area of the plurality of second apertures in the second region of the first inner electrode layer, and a total surface area of the plurality of first apertures in the first region of the second inner electrode layer is less than a total surface area of the plurality of second apertures in the second region of the second inner electrode layer.

2. The multilayer ceramic capacitor according to claim 1, wherein the coverage of the first and second inner electrode layers in the first region is equal to or greater than about 75% and the coverage of the first and second inner electrode layers in the second region is less than about 75%.

3. The multilayer ceramic capacitor according to claim 1, wherein the first region and the second region are scattered over the first inner electrode layer and the second inner electrode layer, without overlapping each other.

4. The multilayer ceramic capacitor according to claim 1, wherein the coverage of the first and second inner electrode layers of the inner electrode layer to the dielectric layer in the first region is about 75% or greater and about 95% or less.

5. The multilayer ceramic capacitor according to claim 1, wherein the coverage of the first and second inner electrode layers of the inner electrode layer to the dielectric layer in the second region is about 30% or greater and about 70% or less.

6. The multilayer ceramic capacitor according to claim 1, wherein the first inner electrode layer includes a plurality of the first inner electrode layers;

the second inner electrode layer includes a plurality of the second inner electrode layers; and the plurality of first inner electrode layers are alternately provided with the plurality of first inner electrode layers in the laminate.

7. The multilayer ceramic capacitor according to claim 6, wherein the plurality of first inner electrode layers and the plurality of second inner electrode layers are equally or substantially equally spaced apart from one another along the lamination direction.

8. The multilayer ceramic capacitor according to claim 1, wherein the first inner electrode layer includes a first opposing electrode portion facing the second inner electrode layer, and a first extraction electrode portion that is located at one end of the first inner electrode layer and extends from the first opposing electrode portion to the first end surface of the laminate; and the second inner electrode layer includes a second opposing electrode portion facing the first inner electrode layer, and a second extraction electrode portion that is located at one end of second inner electrode layer and extends from the second opposing electrode portion to the second end surface of the laminate.

9. The multilayer ceramic capacitor according to claim 8, wherein the first extraction electrode portion is extracted to and exposed at first end surface of the laminate; and the second extraction electrode portion is extracted to and exposed at second end surface of the laminate.

10. The multilayer ceramic capacitor according to claim 1, wherein each of the first inner electrode layer and the second inner electrode layer includes Ni, Cu, Ag, Pd, Au, or an alloy that includes at least one of Ni, Cu, Ag, Pd, and Au.

11. The multilayer ceramic capacitor according to claim 1, wherein each of the first inner electrode layer and the second inner electrode layer has a thickness greater than or equal to about 0.2 μm and less than or equal to about 2.0 μm.

12. The multilayer ceramic capacitor according to claim 1, wherein the first and second regions of each of the first and second inner electrode layers are configured to disperse a difference in compression and expansion between the plurality of dielectric layers and the first and second inner electrodes.

13. The multilayer ceramic capacitor according to claim 1, wherein the first and second regions of each of the first and second inner electrode layers are spaced apart from one another and evenly or substantially evenly distributed across the first and second inner electrode layers.

* * * * *